US012579526B2

(12) United States Patent
Sethia et al.

(10) Patent No.: US 12,579,526 B2
(45) Date of Patent: Mar. 17, 2026

(54) TARGETED REMOTE PAYMENTS LEVERAGING ULTRA-WIDEBAND (UWB) AND MICRO-ELECTROMECHANICAL SYSTEMS (MEMS) SENSOR COMMUNICATIONS

(71) Applicant: Bank of America Corporation, Charlotte, NC (US)

(72) Inventors: Maneesh Kumar Sethia, Hyderabad (IN); Shailendra Singh, Maharashtra (IN); Sandeep Kumar Chauhan, Hyderabad (IN); Saurabh Arora, Gurugram (IN); Nandini Rathaur, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 18/136,925

(22) Filed: Apr. 20, 2023

(65) Prior Publication Data

US 2024/0354725 A1     Oct. 24, 2024

(51) Int. Cl.
| | |
|---|---|
| *G06Q 20/10* | (2012.01) |
| *G01S 5/02* | (2010.01) |
| *G06Q 20/02* | (2012.01) |
| *G06Q 20/20* | (2012.01) |

(52) U.S. Cl.
CPC .......... *G06Q 20/102* (2013.01); *G01S 5/0205* (2013.01); *G06Q 20/027* (2013.01); *G06Q 20/20* (2013.01)

(58) Field of Classification Search
None
See application file for complete search history.

(56) References Cited

U.S. PATENT DOCUMENTS

| | | | | |
|---|---|---|---|---|
| 7,797,367 | B1 * | 9/2010 | Gelvin | .................... H04L 67/12 |
| | | | | 709/200 |
| 2014/0324527 | A1 * | 10/2014 | Kulkarni | ........... G06Q 30/0261 |
| | | | | 705/7.29 |

(Continued)

FOREIGN PATENT DOCUMENTS

| | | | | |
|---|---|---|---|---|
| CA | 2872729 | A1 * | 12/2013 | ............. H10F 99/00 |
| CA | 2986572 | C * | 12/2020 | ............. H04W 12/06 |

(Continued)

*Primary Examiner* — Ariel J Yu
(74) *Attorney, Agent, or Firm* — Weiss & Arons LLP

(57) ABSTRACT

An electronic bill may be generated, transmitted, and paid remotely at a POS using a UWB-compatible user device. The location of the user device may be detected leveraging UWB technology at the POS. The bill may be pushed to the user device over a MEMS network of sensor nodes at the POS. An optimal route over the sensor nodes may be selected so that the electronic bill is directed to a sensor node in proximity to the user device. The selected route may minimize the number of sensor nodes over which the bill must pass. The route may be dynamically changed when the user device is moved from one location to another at the POS. The customer may specify an electronic payment method in response to receiving the bill or the customer may have pre-specified the payment method. An electronic confirmation of payment may be transmitted to the POS.

22 Claims, 7 Drawing Sheets

(56) References Cited

U.S. PATENT DOCUMENTS

2016/0063606 A1*  3/2016  Fedak ..................... H04W 4/02
                                              705/15
2018/0315038 A1*  11/2018  Rezayee .............. H04W 76/10
2021/0248283 A1*  8/2021  Kincart ................... G06T 17/05
2021/0374837 A1*  12/2021  Jabbour ............. G06Q 20/3278
2023/0394463 A1*  12/2023  Cho ................... G06Q 20/3224

FOREIGN PATENT DOCUMENTS

CN          100413271  C  *  8/2008  ......... H04L 12/4625
CN          100417118  C  *  9/2008  ........... H04W 40/24
CN          103155691  B  *  7/2017  ........... H04W 84/18

* cited by examiner

┌─────────────────────────────────────────────┐
│                                             │
│          Sample Payload may include         │
│     data elements and optimal route information │
│                                             │
└─────────────────────────────────────────────┘

⌐600

```
{
"ReceiverNode": "A",
"receiverSubHierarchy":{
                    "fromNode": "121",
                    "toNode": "246"
                    "
            },
"data":{
      "billAmount": "250S",
      "digitalToken": "H87657ffH8798"
      }
   }
```

FIG. 6

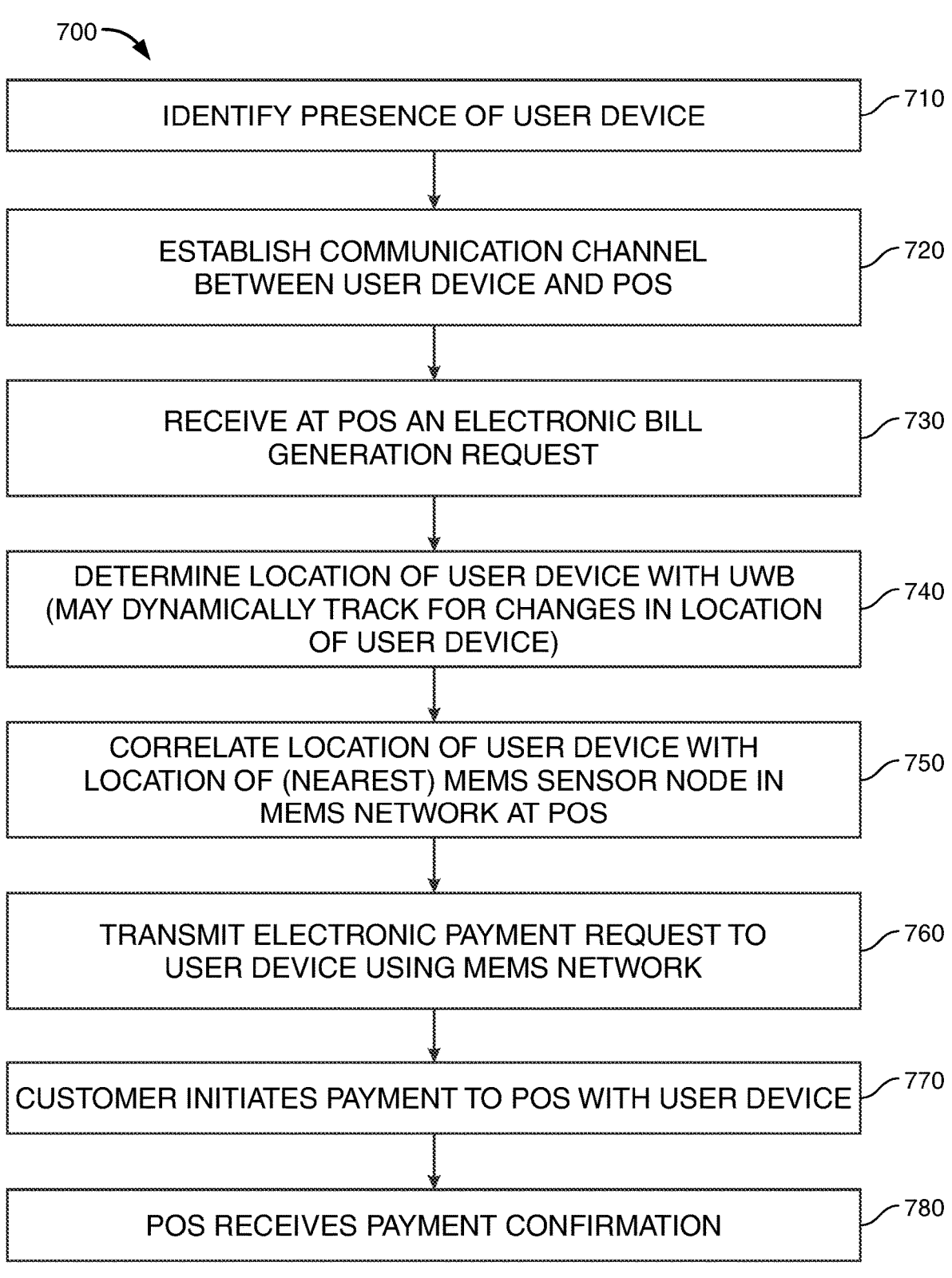

700

IDENTIFY PRESENCE OF USER DEVICE — 710

ESTABLISH COMMUNICATION CHANNEL BETWEEN USER DEVICE AND POS — 720

RECEIVE AT POS AN ELECTRONIC BILL GENERATION REQUEST — 730

DETERMINE LOCATION OF USER DEVICE WITH UWB (MAY DYNAMICALLY TRACK FOR CHANGES IN LOCATION OF USER DEVICE) — 740

CORRELATE LOCATION OF USER DEVICE WITH LOCATION OF (NEAREST) MEMS SENSOR NODE IN MEMS NETWORK AT POS — 750

TRANSMIT ELECTRONIC PAYMENT REQUEST TO USER DEVICE USING MEMS NETWORK — 760

CUSTOMER INITIATES PAYMENT TO POS WITH USER DEVICE — 770

POS RECEIVES PAYMENT CONFIRMATION — 780

FIG. 7

TARGETED REMOTE PAYMENTS LEVERAGING ULTRA-WIDEBAND (UWB) AND MICRO-ELECTROMECHANICAL SYSTEMS (MEMS) SENSOR COMMUNICATIONS

FIELD OF THE DISCLOSURE

Aspects of the disclosure relate to a method and system for electronic remote billing and payments at a point of sale (POS) using a user device to receive and pay an electronic bill.

BACKGROUND OF THE DISCLOSURE

Customers may pay bills at a POS, like a store or other establishment, using cash, cards, such as bank or credit cards, or Zelle QR codes. However, this typically requires that a customer request the bill, have a staff person hand deliver the bill to the customer, retrieve the signed invoice or merchant copy of the credit card receipt along with a bank or credit card, and, if a card is used, then return the card to the customer. The process is time-consuming and burdensome for the customer and the employee.

SUMMARY OF THE DISCLOSURE

It is an object of this invention to provide a method of bill payment in which a user may use a user device at a point of sale (POS) to pay the bill without necessitating that the customer interact directly with a POS employee for bill payment.

It is also an object of this invention to provide for bill payment with a user device that works efficiently to direct the bill to a customer's user device, to enable payment, and to provide a receipt.

A method for electronic payment of a bill at a point of sale (POS) in accordance with principles of the disclosure may include receiving, at a bill generation system of the POS, an electronic bill generation request initiated at a user device, determining a location of the user device using an ultra-wideband (UWB) transceiver at the POS, generating, by the bill generation system to the user device, an electronic payment request for payment of the bill in response to the electronic bill generation request, and transmitting the electronic payment request to the user device using a micro-electromechanical systems (MEMS) network. The user device may include, for example, a digital device or a smart card.

The method may further include detecting, by the POS, a presence of a user device at the POS using the UWB network, and establishing, by the POS, communications between the bill generation system of the POS and the user device. Additionally, the method may include capturing, by the POS, information about the user device, including the type of the user device, wherein the transmitting of the electronic payment request includes transmitting the electronic payment request in a data format suitable for the type of the user device.

The transmission of the electronic payment request to the user device may include transmitting the electronic payment request through a central hub to the MEMS network. The transmission of the electronic payment request to the user device may include transmitting the electronic payment request from the central hub through a router to the MEMS network. The transmission of the electronic payment request to the user device may include transmitting the electronic payment request from the router through a gateway node to the MEMS network.

The MEMS network may include multiple MEMS sensor nodes. The transmitting, by the bill generation system, of the electronic payment request to the user device via the MEMS network may include determining an optimal route through the multiple MEMS sensor nodes over which to route the electronic payment request. The determination of the optimal route may include determining a route that uses a minimum number of hops across one or more of the multiple MEMS sensor nodes to reach the user device.

In embodiments, the optimal route may be determined based on the current location of the user device, as determined by the UWB network, and based on a second location of the respective one of the multiple MEMS sensor nodes nearest to the first location. The method may include routing the electronic payment request from the bill generation system to the user device over the optimal route through one or more of the multiple sensor nodes of the MEMS network. Also, in embodiments, movement of the user device from a first location to a second location at the POS may be tracked and the optimal route over which to route the bill may be dynamically changed when the user device is moved.

There may also be a plurality of MEMS networks. The method of transmitting the electronic payment request to the user device may include selecting the MEMS network over which to route the electronic payment request. One or more of the plurality of MEMS networks may include a respective receiver node located before the respective multiple MEMS nodes to receive and further route the electronic payment request to the respective MEMS node of the multiple MEMS nodes, in the one or more of the plurality of MEMS networks, closest to the user device.

The method may further include receiving an electronic payment in response to the electronic payment request, wherein the electronic payment is initiated using the user device, and transmitting, to the POS, a confirmation of the payment through the gateway node.

An electronic point of sale (POS) billing system in accordance with principles of the disclosure may include a bill generation system configured to receive an electronic bill generation request from a user device, wherein the user device is ultra-wideband (UWB)-enabled, and to generate, in response, an electronic payment request to be transmitted to the user device. The billing system may further include an ultra-wideband (UWB) device configured to determine a location of the user device at the POS to which the electronic payment request for a bill is to be transmitted, and one or more micro-electromechanical systems (MEMS) networks configured to transmit the electronic payment request generated by the bill generation system to the user device. A MEMS network may include multiple MEMS sensor nodes.

The billing system may include a proximity detector, in communication with the UWB device, that may be configured to detect the user device when in proximity to the POS and to identify the location of the user device using the UWB device.

The billing system may include a central hub that receives the electronic payment request from the bill generation system. The billing system may include a gateway node and the one or more MEMS networks, wherein the central hub is configured to route the electronic payment request through the gateway node to a first MEMS network or a second MEMS network. Each of the first MEMS network or the second MEMS networks may include a respective receiver node located before the respective multiple MEMS nodes to receive and further route the electronic payment request to the respective MEMS node of the multiple MEMS nodes closest to the user device along the optimal route.

The billing system may further include a router. The bill generation system, the central hub or the router may be configured to determine an optimal route through the multiple MEMS sensor nodes in the one or more MEMS networks over which to route the electronic payment request. The optimal route may be determined based on a first location of the user device, as determined by the UWB system, and based on a second location of the respective one of the multiple MEMS sensor nodes nearest to the first location.

One or more of the bill generation system, the central hub, or the router may be further configured to receive one or more indications of a movement of the user device at the POS from the first location to a new location and to update the optimal route over which to route the electronic payment request dynamically to reflect the new location of the user device.

The billing system may further include an interface at the billing origination system that is configured to receive an electronic payment confirmation via the gateway node.

The UWB transceiver may be configured to capture information about the user device, including the type of the user device such that the bill is electronically transmitted to the user device in a format suitable for the type of the user device. The user device may be, for example, a digital device or a smart card.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows an illustrative example of data and routing information that may be included as a payload in a data packet for route optimization of the data in accordance with principles of the disclosure.

FIG. 7 shows an illustrative flow chart of steps that may be performed to perform electronic billing and payments at a POS in accordance with principles of the disclosure.

DETAILED DESCRIPTION OF THE DISCLOSURE

Figure 1:
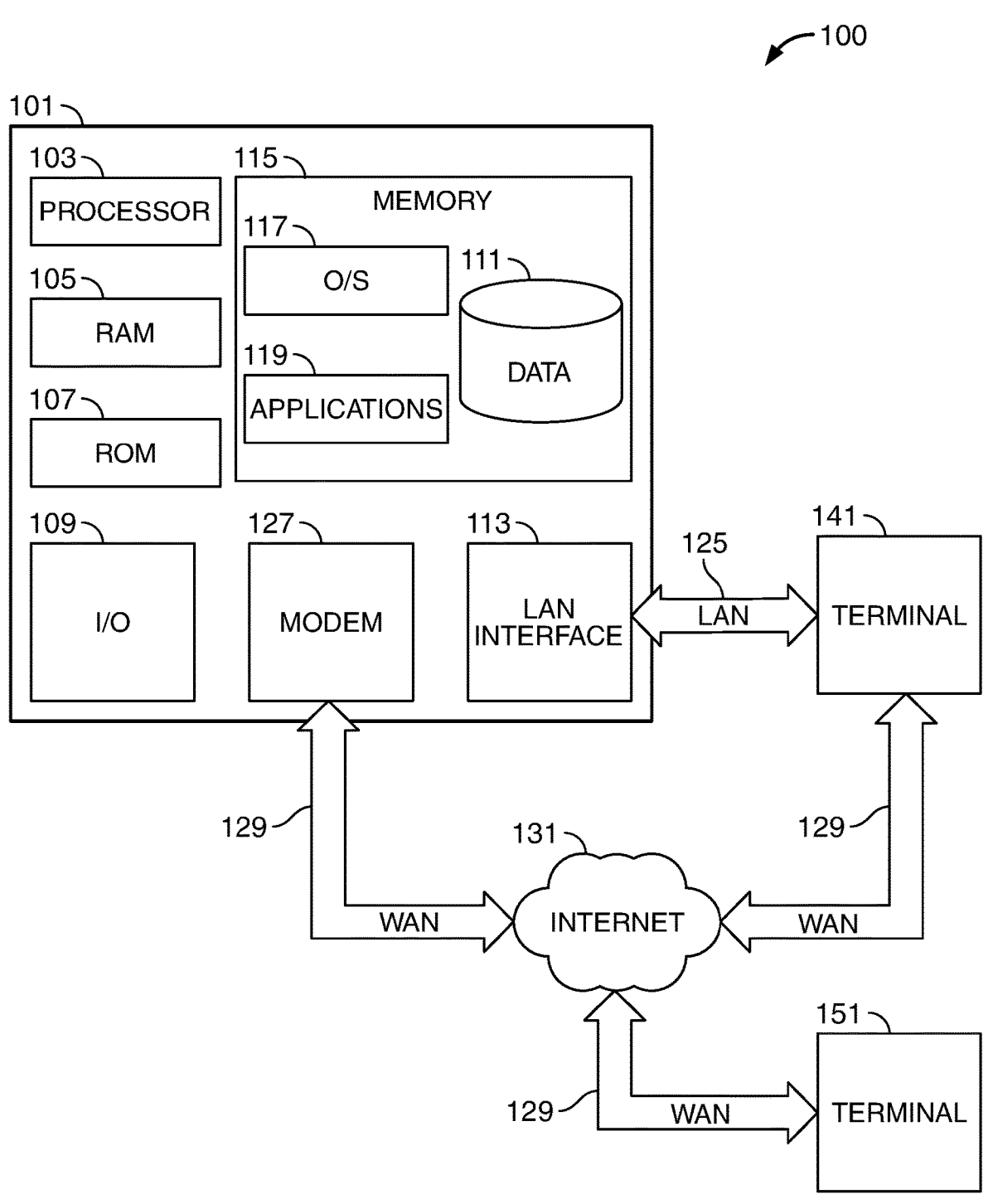
FIG. 1 shows an illustrative system architecture in accordance with principles of the disclosure.

The present disclosure relates to an electronic billing system that may be implemented at a point of sale (POS), such as at a merchant where goods or services are sold, such as at a store, a conference center where goods or services may be sold, or at another type of establishment. Customers may use a user device to electronically request and receive a bill from a POS. User device may be, for example, a device such as a smart mobile device like a digital device or a smart card. A digital device may be, for example, a device such as a smartphone, a laptop, or a tablet. The bill may be transmitted from the POS, such as upon customer request, to the user device via one or more MEMS nodes. The bill may be paid using the user device.

Ultra-wideband (UWB) wireless communication technology may be leveraged to communicate with the POS and a UWB-compatible user device. The UWB technology may measure locations to a high accuracy, such as to an accuracy of 10 cm. The UWB technology may be used to detect when the UWB-compatible user device is within proximity to the POS, to calculate the current location of the user device, and to track the location of the user device if the customer changes locations within the POS. The UWB technology may use a UWB device, such as a transceiver (beacon) to communicate with the user device. Upon detection, by a UWB transceiver, of a user device in proximity to the POS, the POS may communicate with the detected user device to request that the user device establish a secure communication channel with the POS. Alternatively, the customer, using the user device, may send a request to the POS that the secure communication channel be established. The secure communication channel may be established when the user device is first detected or at a later time.

One or more networks of MEMS sensor nodes ("mote nodes") may be set up at different locations within the POS, such as at different places in a room or at a table. The locations of the sensor nodes may be provided to the POS to enable the POS to pinpoint the location of the user device and identify the MEMS sensor node that is closest to the user device. Each sensor node may act as a remote sensor and may include a wireless transceiver. By correlating the location of the customer using the UWB network to a particular MEMS sensor node at that location, the customer's bill may be efficiently and quickly pushed over an optimal route to the correct user device as described below. The billing system thus leverages UWB technology in conjunction with micro electromechanical system (MEMS) sensor nodes.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The computer program products, methods, systems, and apparatus described herein are illustrative. The computer program products, methods, systems, and apparatus of the invention may involve some or all of the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

In some embodiments, computer 101 and/or Terminals 141 and 151 may be any of mobile devices that may be in electronic communication with consumer device 106 via LAN, WAN or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
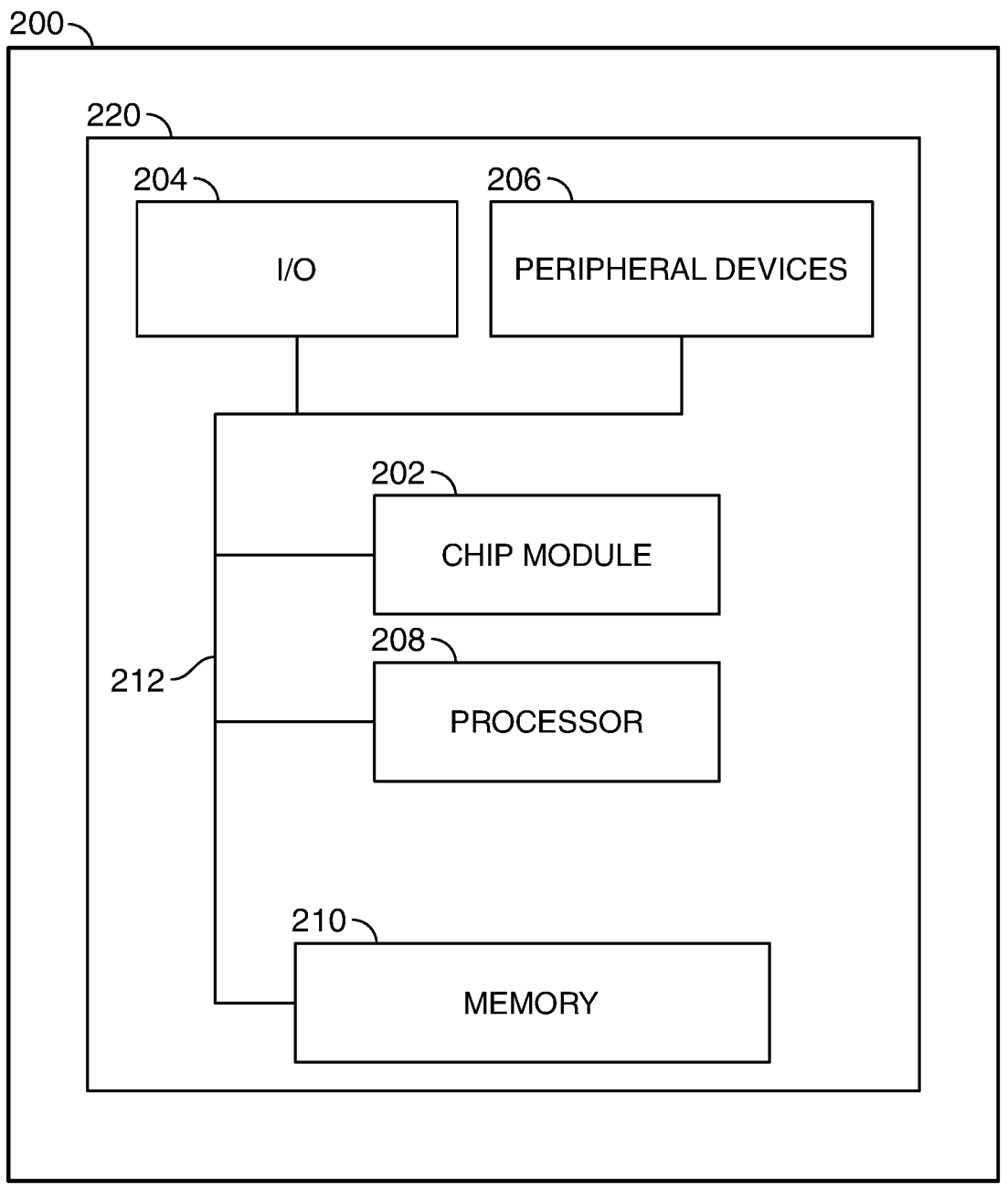
FIG. 2 shows an illustrative apparatus of a device in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
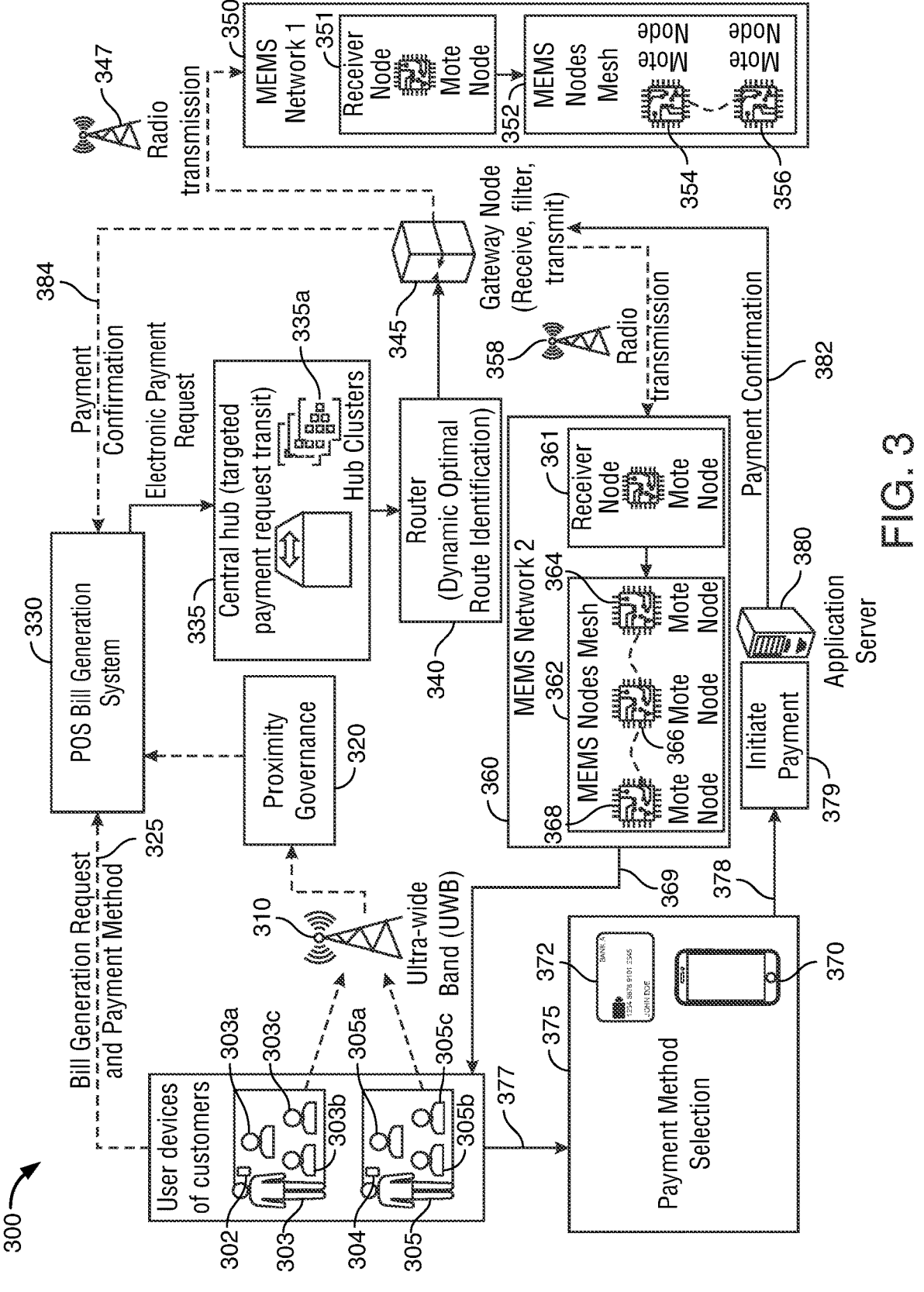
FIG. 3 shows an illustrative example of a system, including an electronic bill payment system, that may be implemented at a POS in accordance with principles of the disclosure.

FIG. 3 shows an illustrative example of a system 300 that may be implemented at a POS in accordance with principles of the disclosure for electronic billing of one or more customers at the POS.

There may be one or multiple customers at the POS at a particular time. For example, FIG. 3 shows two groups of four individuals that may be standing or sitting near each other. Each of the customers may have their own user device. One or more of the user devices may be UWB-compatible so that the user devices work with system 300. Each user device may request a separate bill to be directed by the electronic billing system to the requesting user device.

System 300 may use UWB communication technology that includes one or more UWB transceivers 310 for the POS to detect UWB-compatible user devices, such as devices 302, 304, at the POS once the devices come within UWB range of the POS, to determine the current location of the devices, to track movement of the devices to new locations, and to communicate the details to UWB-compatible device. The user devices may be UWB-enabled digital devices, such as mobile devices, laptops or tablets, or smart cards, that may be used for making payments, and may be tracked by the UWB network.

A proximity governance module 320, such as may be resident on an UWB-compatible computer at the POS, may include a proximity detector and may be used by the POS for the detection and tracking of the location and movement of the user devices. The UWB technology may be used to pinpoint the customer's precise location and feed the details to proximity governance module 320 at POS for targeted bill transmission. The location information may also be used for targeting other information, such as advertising or promotions, to the user device. The proximity governance module 320 may provide the captured location information to the electronic bill generation system 330. The UWB technology may be used to obtain information about the user device to which the bill is to be sent, including the device identifier. As multiple individuals may be situated near each other, the UWB technology may be configured to sense which device sends a particular request for an electronic bill so that the resulting bill may be sent to the correct destination device. As noted below, a user device may provide the device identifier that may be used to identify the destination to which the bill is to be sent. If the bill is to be sent to a different user device, the user device may specify the device identifier of a different user device which the customer has in its possession.

The POS may further include an electronic bill generation system 330 for generating (originating) electronic payment requests to customers. Bill generation system 330 may generate an electronic payment request (bill) for a particular customer that is to be directed to the customer's user device. The bill may be generated at any time such as, for example, at the time that the order is placed, after the customer receives the requested items, or at an earlier or later time upon customer request 325. The bill generation request from the user may include a specific payment method to select how the customer wishes to pay the bill.

Bill generation system 330 may be implemented, for example, as software on a computer or on a UWB-compatible electronic cash register. Bill generation system 330 may be a standalone system or may be included as a component within a larger POS software product like an order processing system that may be used for processing orders. The amount to be billed may be captured automatically, if available to be input to bill generation system in electronic form at POS, or may be entered at bill generation system 330 manually. The electronic payment request may be transmitted as one or more data packets and may include a payload that specifies the targeted user device to which the bill is to be directed. The payload may also include a path to be followed to reach the user device, if that information is available to the bill generation system 330, so that the bill reaches the correct user device. Bill generation system 330 may be programmed to prepare the electronic payment requests differently depending on the user device. For example, the electronic payment request may have one format if it is to be sent to one type of smartphone, may have a second, different format if it is to be sent to another type of smartphone, and a third, different format if it is to be sent to a smart card.

System 300 may further include one or more MEMS networks 350, 360 through which the electronic payment request may be forwarded to the user device(s). There may be several network elements included between bill generation system 330 and the one or more MEMS networks 350, 360. These elements may include a central hub 335, a router 340, and a gateway node 345.

Central hub 335 may be provided at the POS to orchestrate the transmissions of electronic payment requests generated by the bill generation system 330 to be forwarded to the various destination user devices. Central hub 335 may include hub clusters 335a to transmit multiple payment requests to different customers. Central hub 335 may monitor the number and identities of the user devices interacting with the POS at a given time in order to orchestrate the transmissions to the user devices.

Bill generation system 330, central hub 335, or a router 340, connected to central hub 335, may be used to determine an optimal route over the MEMS networks 350, 360, over which to transmit the electronic payment request to the correct user device. In embodiments, the optimal route may be the route with the shortest number of hops through a MEMS network to reach the user device. The route for each electronic payment request may be determined once or may be dynamically changed by router 340 when a user device is moved, such as when a customer moves within the POS. The route to be followed may be added, by router 340, to the data packets of the electronic payment request. There may be multiple MEMS networks in which case the route may specify a particular MEMS network through which the request is to be routed in addition to specifying the pathway through MEMS sensor nodes in the MEMS network to be used.

The electronic payment request may be routed by router 340 through a MEMS gateway node 345 to the MEMS networks. Gateway node 345 may receive the electronic payment request, filter the request, and propagate the request to the nearby receiver node of the specified MEMS network. The transmission from gateway node 345 to MEMS network 350 or 360 may be via wireless transmission 347 or 358, such as, for example, via Wi-Fi, Bluetooth, or Zigbee, or another wireless technology.

Each of the MEMS networks 350, 360 may include a respective receiver node 351, 361, which is a sensor node (mote node) that receives all transmissions to that network and forwards them to specified sensor nodes in a MEMS nodes mesh. The MEMS sensor node may be formed by smart dust applied in specific locations with the POS. The MEMS sensors may be extremely small and not visible to the customers. To determine the optimal route over which to send the request to the appropriate destination user device, one or more of the elements of system 300 at the POS, such as bill generation system 330, central hub 335, or router 340 may be kept informed of the locations of the MEMS sensor nodes at the POS.

The data packets of the request are next forwarded to through a designated pathway of the MEMS sensor nodes. MEMS network 350 may include a sensor nodes mesh 352 having, for example, two sensor nodes 354, 356. MEMS network 360 may include a sensor nodes mesh 362 having, for example, at least three sensor nodes 364, 366, 368 that the data packets may traverse to reach the destination user device. However, the number of MEMS networks may vary and may include one MEMS network or more than two MEMS networks. The number of sensor nodes in each mesh may also vary and may be more than two or three sensor nodes.

The MEMS nodes may be spaced apart from one another at varying distances. They may be spaced closely together, such as a foot apart, or they may be spaced, for example, 20-30 feet apart from one another.

The electronic payment request may be routed through one of the MEMS networks to the targeted user device, which may be, for example, mobile phone 370 or smart card 372 in FIG. 3. These devices may be one of user device 302 or 304, that initially requested a bill or the bill generation request may have requested that the bill be sent to a different user device such that mobile phone 370 or smart card 372 do not correspond to user device 302 or 304. Upon receipt of the electronic payment request, the customer may specify the payment method at 377 with user device 302 or 304, depending on the customer.

If the customer did not previously specify a payment method, the customer may select a payment method at 375 upon receipt of the electronic payment request. The user device which issued the bill generation request, such as user device 302 or 304, may then cause the initiation of an electronic payment to be arranged and processed using application server 380. Application server 380 may also be configured to generate a payment confirmation 382 that may be transmitted back to bill generation system 330 to notify bill generation system of successful payment. The payment confirmation 382 may include a bank code that confirms payment. The transmission from application server 380 may pass through gateway node 345. Application server 380 may also cause the generation of an electronic receipt to be sent to the customer such as via a text message, an email, or an app on the user device.

Figure 4:
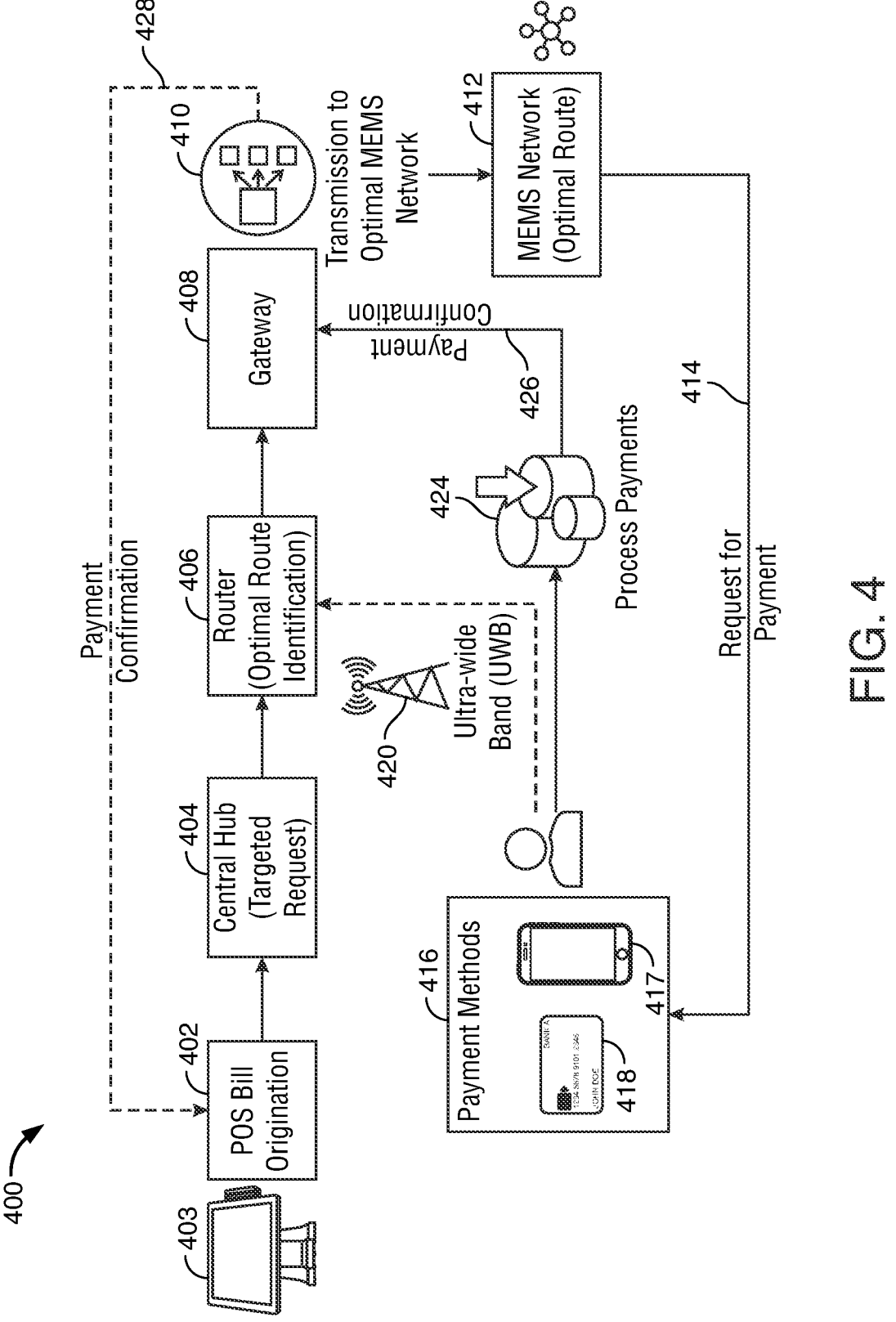
FIG. 4 shows an illustrative example of a workflow for the electronic bill payment system in accordance with principles of the disclosure.

FIG. 4 shows another illustrative example of an electronic bill payment system 400 and a workflow using system 400 in accordance with principles of the disclosure.

In this example, a bill generation system 402 at a POS receives a bill generation request from user device 403. In response, an electronic payment request is generated (originated) by bill generation system 402 and is forwarded to a router 406. The bill generation system 402 may not have to provide the routing information for the bill if the location of the customer using UWB technology is provided directly to router 406 to generate the optimal route. The electronic payment request may then be forwarded to gateway 408 from which the request is forward to the optimal MEMS network, such as MEMS network 412. The request may then be forwarded to the user device 403 and a payment method may be selected by the customer, in response, if the payment method is not previously specified. The payment is processed at 424, such as by use of a payment processing system at an application server, and a payment confirmation may be sent through gateway 408 and through the MEMs network to bill generation system 402. As the location from the UWB in this example is provided to the router directly, the UWB may not need to provide the location information for the user device to the bill generation system, such as via a UWB-compatible proximity governance module.

Figure 5:
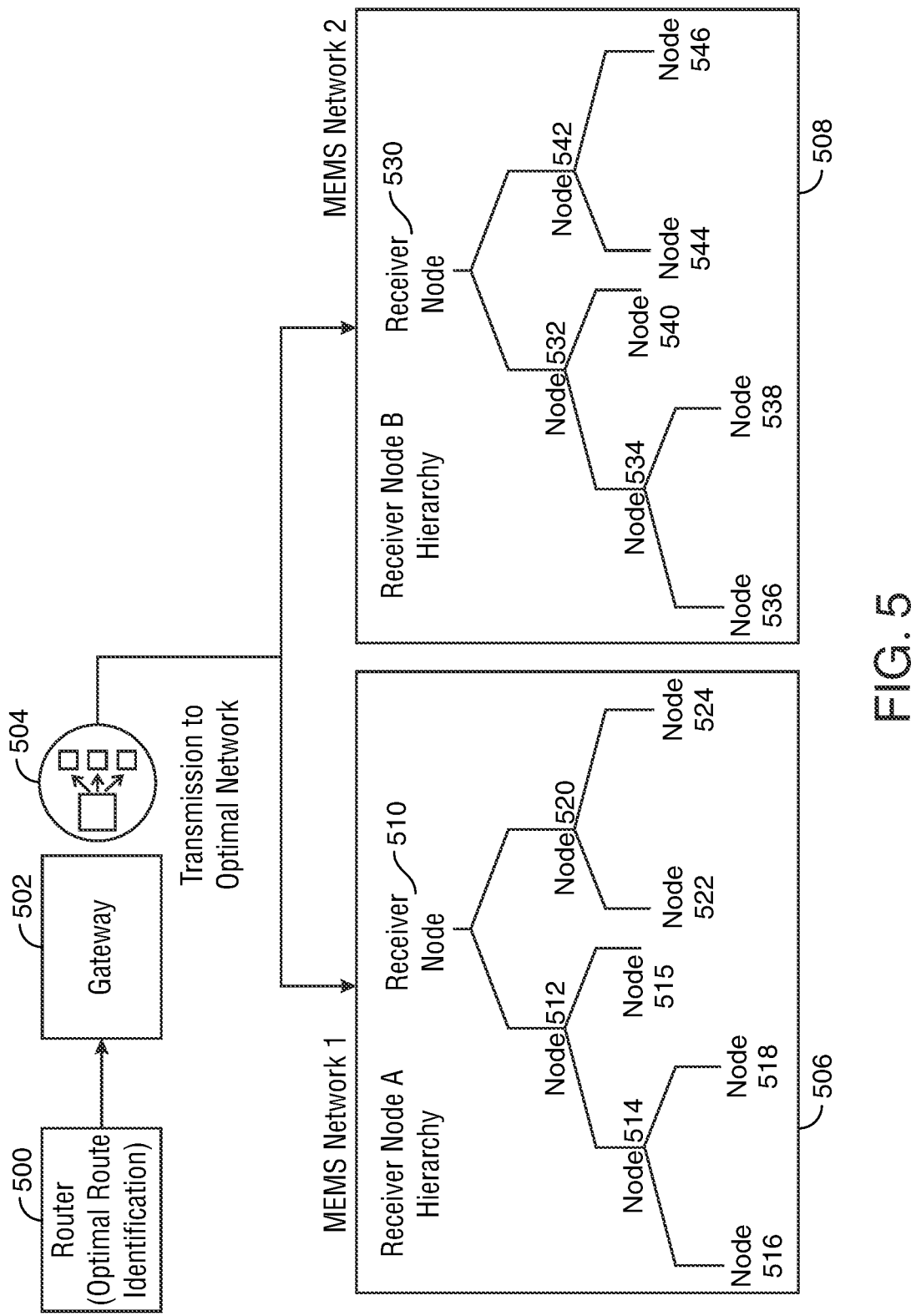
FIG. 5 shows an illustrative example of a route optimization for transmitting a payload to a destination node near a user device in accordance with principles of the disclosure.

FIG. 5 shows an illustrative example of possible routes for an optimal routing of an electronic payment request over the MEMS networks. As described above, a router 500 determines the optimal route. The request may be in the form of data packets and routed through a gateway 502 and transmitted to an optimal one of two MEMS networks 506, 508 and routed through the specified network 506 or 508 and specified MEMS sensor nodes in the specified network. In this example, two MEMS networks 506, 508 are shown. Each of the MEMS networks 506, 508 includes a respective receiver node 510, 530 at which the electronic payment request is received if the request is transmitted to that network.

The MEMS nodes other than the receiver nodes may be sensor nodes (mote nodes) within the MEMS mesh. MEMS network 506 may include as sensor nodes, for example, in the mesh nodes 512, 514, 515, 516, 518, 520, 522, 524. These sensor nodes may be arranged in a hierarchy A of nodes, as shown in FIG. 5. MEMS network 508 may include as sensor nodes, for example, in the mesh nodes 532, 534, 536, 538, 540, 542, 544, and 546, which may be arranged in a hierarchy B of nodes as shown in FIG. 5. The destination user device may be located closer to one of the nodes in either MEMS network than the other nodes. An optimal path, including an optimal network, may be determined to reach the user device with the shortest number of hops to the sensor node nearest the location of the user device based on a determination by UWB technology. An optimal path could alternatively be directed to a different node that may not be the closest to the location of the user device, such as where the sensor node closest to the current location of the user device is being used at the time for multiple other payment requests.

As an example, an optimal route for a user device that is near sensor node 518 in network 506 may be determined to be a route for data packets that include the electronic payment request to traverse nodes 510, 512, 514, 518 to reach the destination user device. As another example, where the user device is near sensor node 532, the route for the data packets may traverse nodes 530 and 532 to reach the destination user device. The use of an optimal route rather than transmitting the request to all sensor nodes may enhance network efficiency and enhance privacy as the information is not available at all sensor nodes.

FIG. 6 shows an illustrative sample payload that may be included in one or more data packets that transport the electronic payment request over the network. This information may be added by the POS at the time of the originator of the bill or the information may be added later, such as by router 340. The payload may include data from the bill and optimal route information. For example, a MEMS network to be used may be specified, if there is more than one MEMS network. The MEMS network may be designated by a receiver node, such as Receiver Node A. A subhierarchy may also be designated that may indicate the hops from one sensor node to another sensor node over which the data packet should be routed. The payload may further include other data elements including the bill amount and a digital token that uniquely identifies the transaction.

FIG. 7 shows an illustrative flow chart 700 of method steps that may be performed in accordance with principles of the disclosure.

At step 710, the UWB technology, including one or more UWB transceivers/beacons, may detect (identify) the presence of a UWB-compatible user device at the POS. At step 720, a communication channel may be established between the user device and the POS. At step 730, the POS may receive an electronic bill generation request, which may be sent by the user device, and may generate an electronic payment request (bill). At step 740, the location of the user device may be tracked using UWB. The tracking may be performed dynamically for changes in location of the user device.

At step 750, the location of the user device may be correlated with a location of a MEMS sensor node in a MEMS network at the POS. The location of the MEMS sensor node may be the location of the MEMS sensor node nearest to the POS. The location may be correlated, for example, at the router or before the electronic payment request reaches the router. At step 760, the electronic payment request may be routed to the destination user device using the MEMS network via a path, e.g. the optimal path, that may be determined at the router. At step 770, the user device may be used by the customer to initiate payment to the POS. At step 780, the POS may receive an electronic payment confirmation.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, computer program products, methods, systems, and apparatuses may leverage UWB and MEMS technologies to perform remote electronic billing at a POS. Persons skilled in the art will appreciate that the present invention can be practiced by other than the described embodiments, which are presented for purposes of illustration rather than of limitation.

What is claimed is:

1. A method for electronic payment of a bill at a point of sale (POS), the method comprising:

receiving, at a bill generation system of the POS, an electronic bill generation request initiated at a user device that requests generation of the bill;

determining a location of the user device using an ultra-wideband (UWB) transceiver at the POS;

generating, by the bill generation system for the user device, an electronic payment request for payment of the bill in response to the electronic bill generation request;

transmitting the electronic payment request to the user device using a micro-electromechanical systems (MEMS) network, wherein the MEMS network comprises multiple MEMS sensor nodes that are positioned at different locations at the POS; and routing the electronic payment request from the bill generation system to the user device through one or more of the multiple MEMS sensor nodes to one of the one or more of the multiple MEMS sensor nodes that is nearest to the user device;

wherein the location of the user device is correlated to one of the different locations of the multiple MEMS sensor nodes that is nearest to the user device for the routing of the electronic payment request to the user device.

2. The method of claim 1, further comprising:

detecting, by the POS, a presence of a user device at the POS using the UWB network; and establishing, by the POS, communications between the bill generation system of the POS and the user device.

3. The method of claim 1, further comprising:

capturing, by the POS, information about the user device, including the type of the user device, wherein the transmitting of the electronic payment request comprises transmitting the electronic payment request in a data format suitable for the type of the user device.

4. The method of claim 1, wherein the location of the user device is the first location; and the transmitting, by the bill generation system, of the electronic payment request to the user device via the MEMS network comprises:

determining an optimal route through the multiple MEMS sensor nodes over which to route the electronic payment request; wherein the optimal route is determined based on the first location of the user device, as determined by the UWB network, and based on a second location of the respective one of the multiple MEMS sensor nodes nearest to the first location; and wherein routing the electronic payment request comprises routing the electronic payment request from the bill generation system to the user device over the optimal route through the one or more of the multiple sensor nodes of the MEMS network.

5. The method of claim 4, further comprising:

tracking movement of the user device at the POS; wherein the determination of the optimal route over which to route the bill comprises dynamically changing the optimal route when the user device is moved from the first location to a second location.

6. The method of claim 4, wherein determining the optimal route comprises determining a route that uses a minimum number of hops across one or more of the multiple MEMS sensor nodes to reach the user device.

7. The method of claim 4, wherein transmitting the electronic payment request to the user device further comprises selecting the MEMS network from a plurality of MEMS networks over which to route the electronic payment request.

8. The method of claim 7, wherein transmitting the electronic payment request to the user device further comprises transmitting the electronic payment request through a central hub to the MEMS networks.

9. The method of claim 7, wherein transmitting the electronic payment request to the user device further comprises transmitting the electronic payment request through a gateway node to the MEMS networks.

10. The method of claim 9, further comprising:

receiving an electronic payment in response to the electronic payment request, wherein the electronic payment is initiated using the user device; and transmitting, to the POS, a confirmation of the payment through the gateway node.

11. The method of claim 7, wherein one or more of the plurality of MEMS networks comprises a respective receiver node located before the respective multiple MEMS nodes to receive and further route the electronic payment request to the respective MEMS node of the multiple MEMS nodes, in the one or more of the plurality of MEMS networks, closest to the user device.

12. The method of claim 1, wherein the user device comprises a digital device or a smart card.

13. An electronic point of sale (POS) billing system, comprising:

a bill generation system configured to:

receive an electronic bill generation request from a user device, wherein the electronic bill generation request requests generation of a bill; and wherein the user device is ultra-wideband (UWB)-enabled; and generate, in response, an electronic payment request to be transmitted to the user device;

an ultra-wideband (UWB) device configured to determine a location of the user device at the POS to which the electronic payment request for a bill is to be transmitted; and one or more micro-electromechanical systems (MEMS) networks configured to transmit the electronic payment request generated by the bill generation system to the user device, wherein:

one of the one or more MEMS networks comprises multiple MEMS sensor nodes;

the multiple MEMS sensor nodes are configured to be positioned at different locations at the POS;

the one of the one or more MEMS networks is configured to transmit the electronic payment request to the user device through one or more of the multiple MEMS sensor nodes to one of the one or more of the multiple MEMS sensor nodes that is nearest to the user device; and the location of the user device is correlated to one of the different locations of the multiple MEMS sensor nodes that is nearest to the user device for the routing of the electronic payment request to the user device.

14. The billing system of claim 13, further comprising:

a proximity detector, in communication with the UWB device, configured to detect the user device when in proximity to the POS and to identify the location of the user device using the UWB device.

15. The billing system of claim 13, wherein:

the UWB device is configured to capture information about the user device, including the type of the user device such that the bill is electronically transmitted to the user device in a format suitable for the type of the user device.

16. The billing system of claim 13, further comprising:

a router configured to determine an optimal route through the multiple MEMS sensor nodes in the one or more MEMS networks over which to route the electronic payment request;

wherein the location of the user device is the first location; and wherein the optimal route is determined based on the first location of the user device, as determined by the UWB system, and based on a second location of the one of the one or more of the multiple MEMS sensor nodes that is nearest to the first location.

17. The billing system of claim 16, wherein the router is further configured to receive one or more indications of a movement of the user device at the POS from the first location to a new location and to update the optimal route over which to route the electronic payment request dynamically to reflect the new location of the user device.

18. The billing system of claim 16, further comprising:

a central hub that receives the electronic payment request from the bill generation system and transmits the electronic payment request to the router.

19. The billing system of claim 18, further comprising:

a gateway node connected to the router and the one or more MEMS networks, wherein the central hub is configured to route the electronic payment request through the gateway node to a first MEMS network or a second MEMS network of the one or more MEMS networks.

20. The billing system of claim 19, wherein one or more of the first and second MEMS networks comprises a respective receiver node located before the respective multiple MEMS nodes to receive and further route the electronic payment request to the respective MEMS node of the multiple MEMS nodes closest to the user device along the optimal route.

21. The billing system of claim 20, further comprising:

an interface at the billing origination system configured to receive an electronic payment confirmation via the gateway node.

22. The billing system of claim 13, wherein the user device comprises a digital device or a smart card.

\* \* \* \* \*